Sept. 11, 1928.
C. DOERING ET AL
BUTTER PRINT MACHINE
Filed Jan. 28, 1924
1,683,873
7 Sheets-Sheet 2
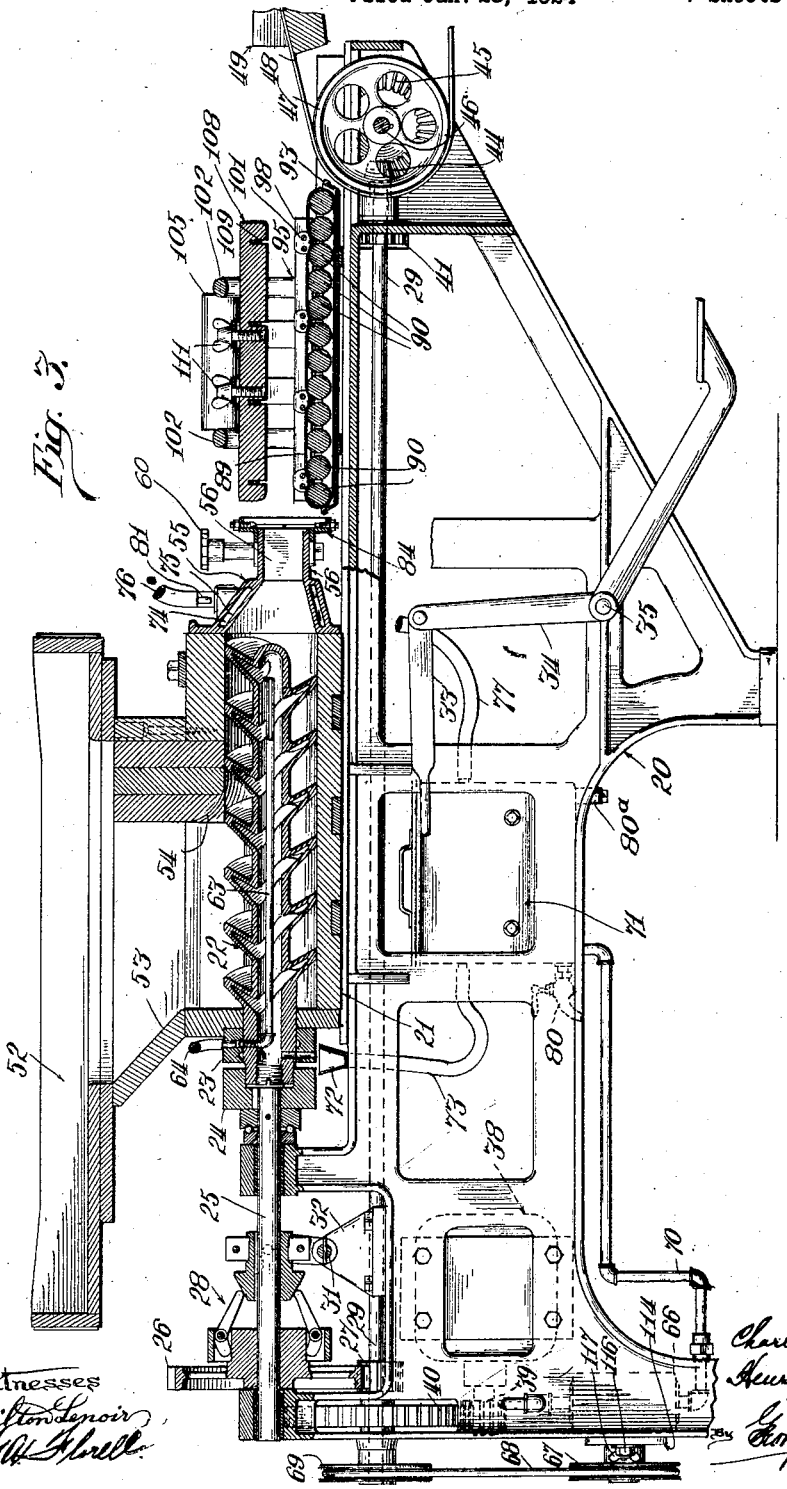

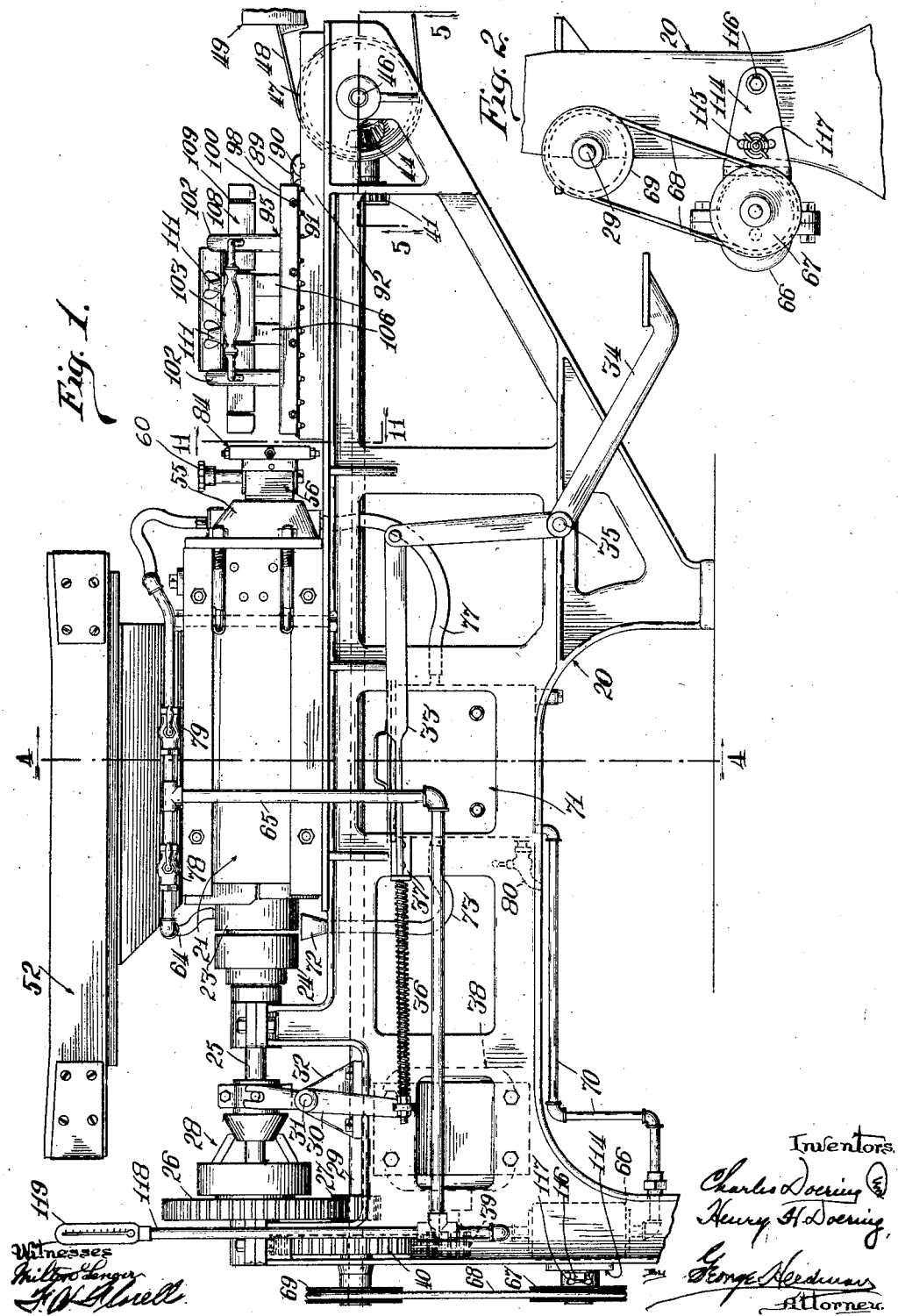

Sept. 11, 1928.  
C. DOERING ET AL  
1,683,873  
BUTTER PRINT MACHINE  
Filed Jan. 28, 1924 7 Sheets-Sheet 3
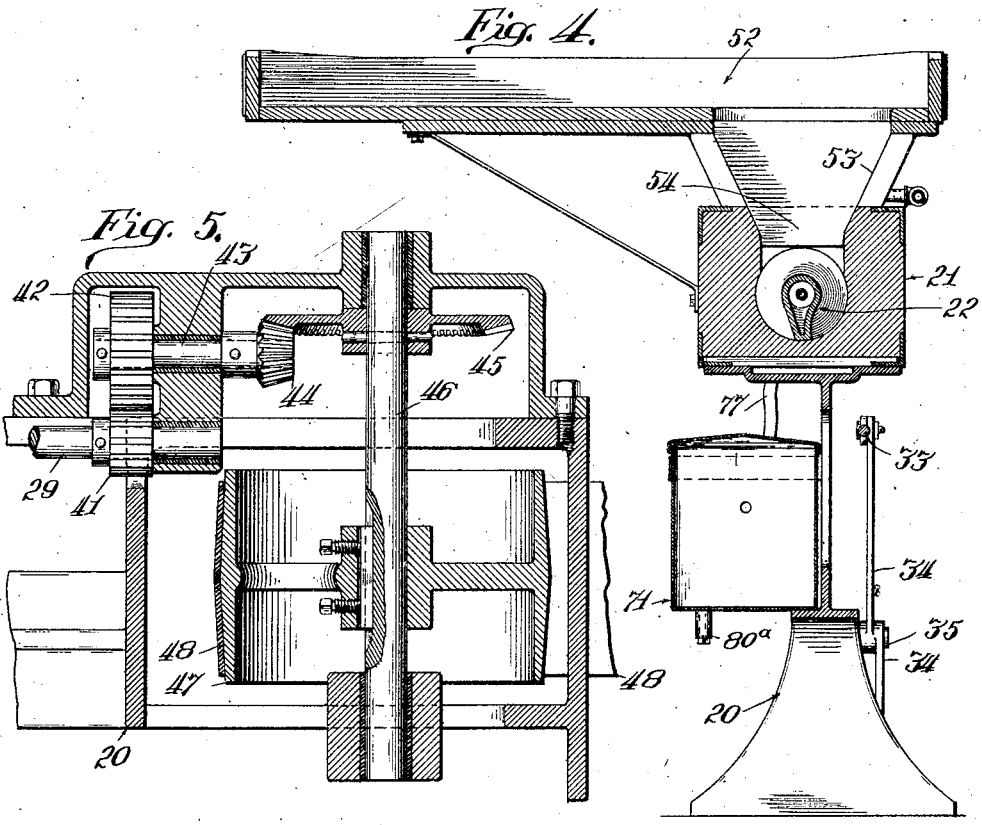
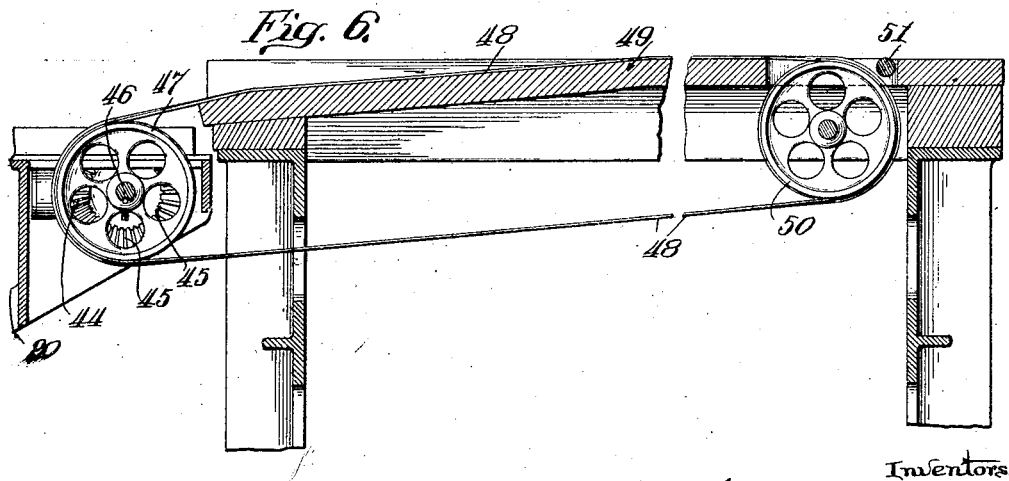

Sept. 11, 1928.
C. DOERING ET AL
1,683,873
BUTTER PRINT MACHINE
Filed Jan. 28, 1924 7 Sheets-Sheet 4
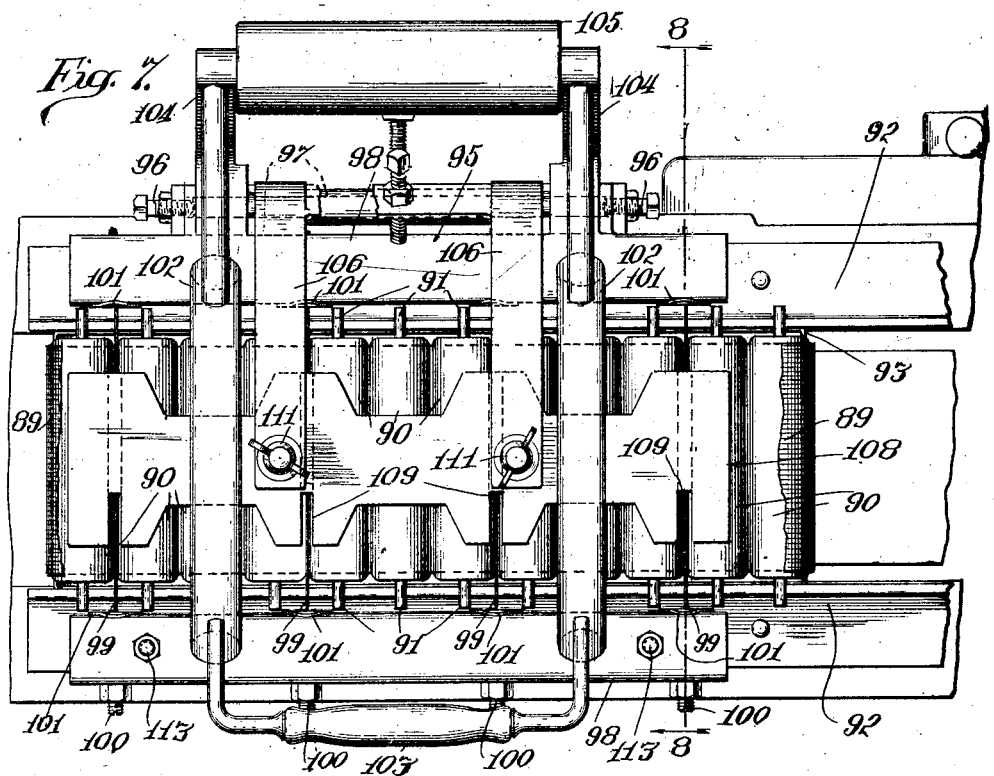
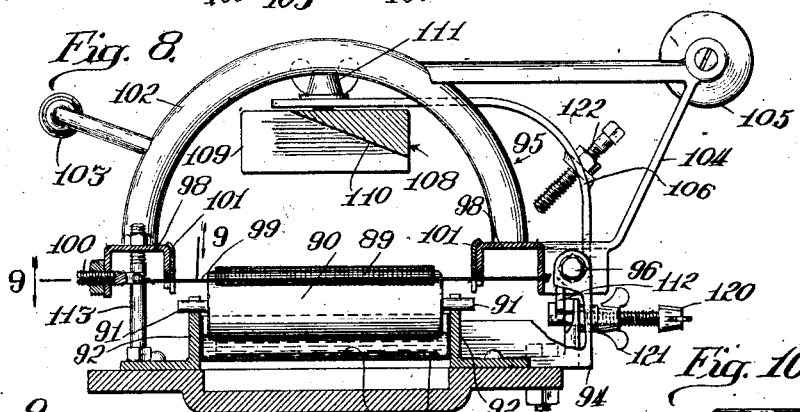
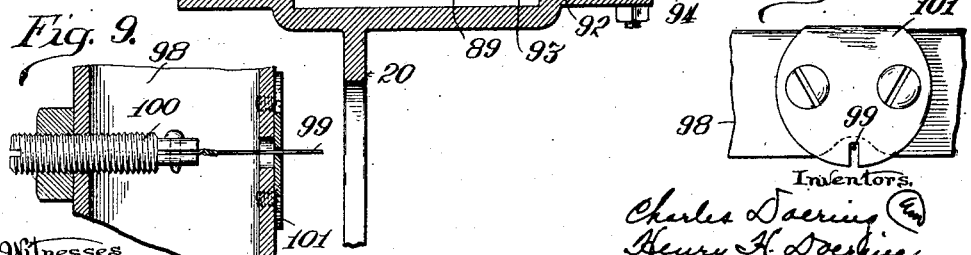

Sept. 11, 1928.
C. DOERING ET AL
1,683,873
BUTTER PRINT MACHINE
Filed Jan. 28, 1924
7 Sheets-Sheet 5
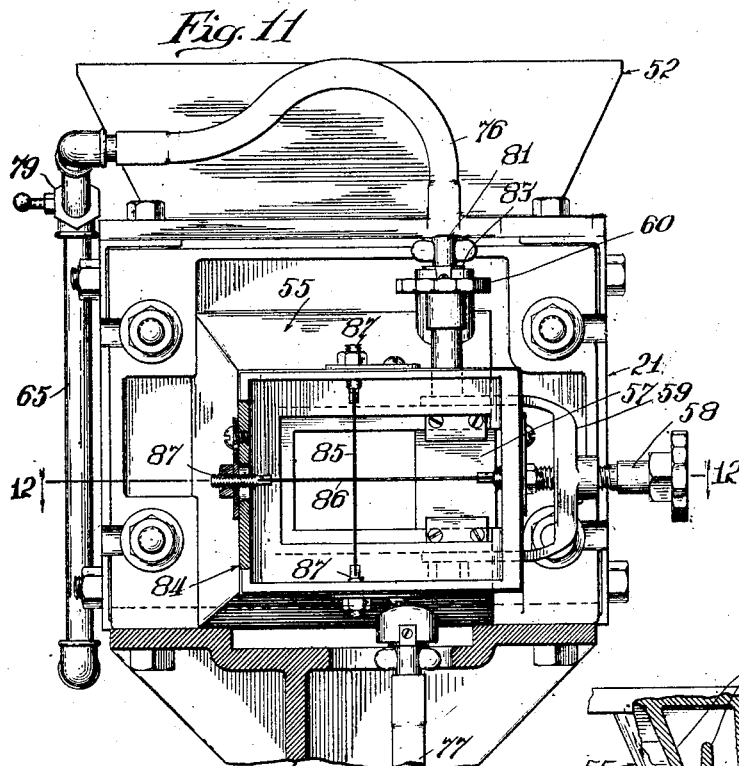
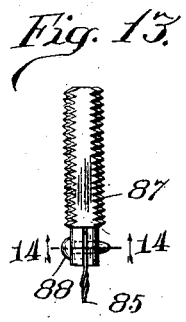
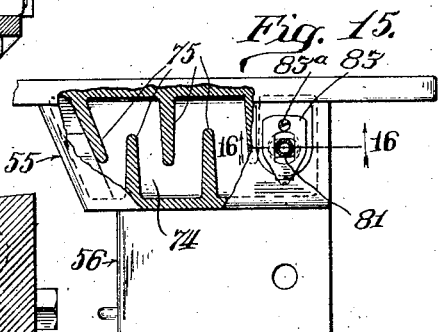
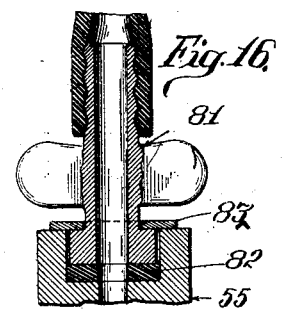

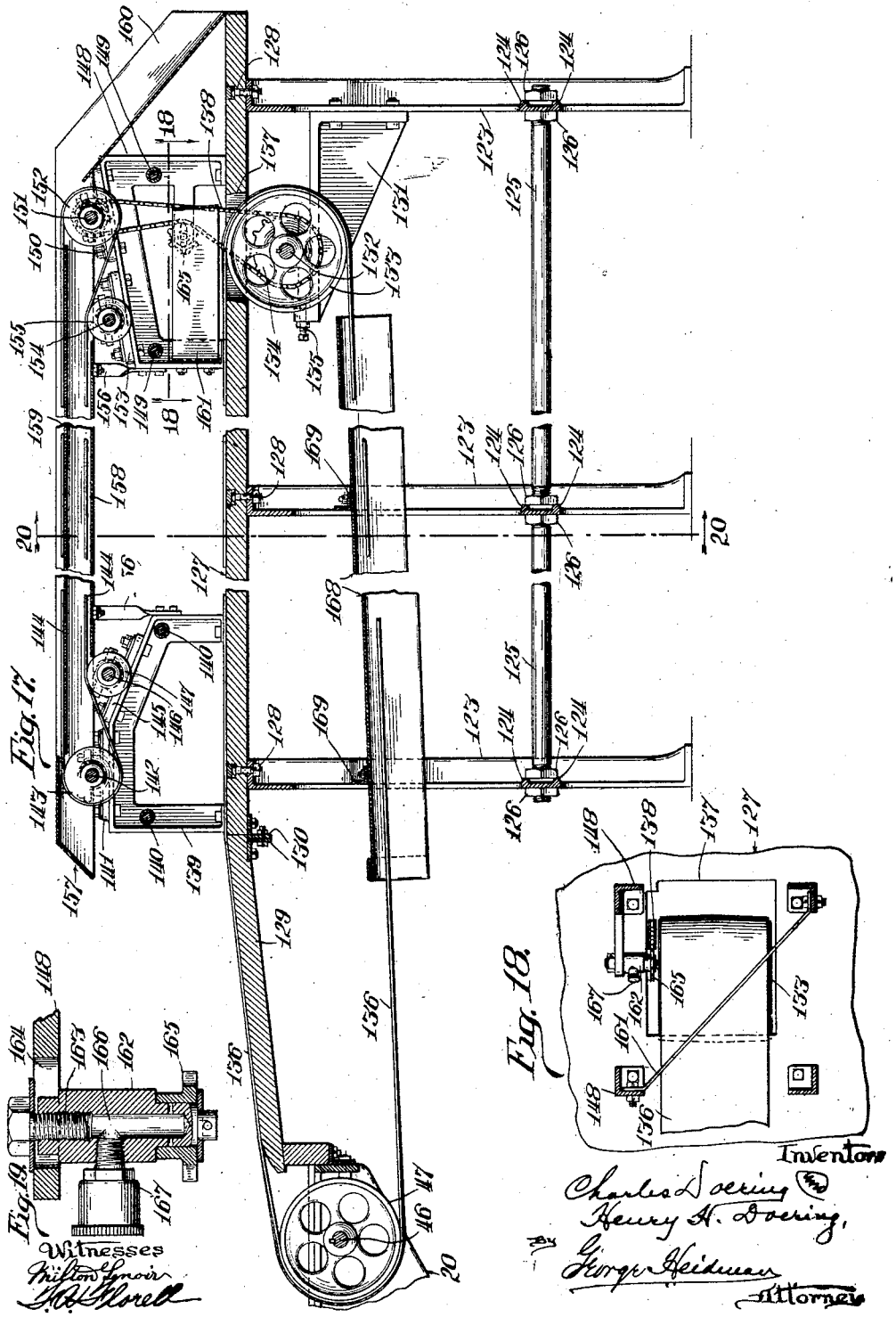

Sept. 11, 1928.
C. DOERING ET AL
1,683,873
BUTTER PRINT MACHINE
Filed Jan. 28, 1924  7 Sheets-Sheet 7
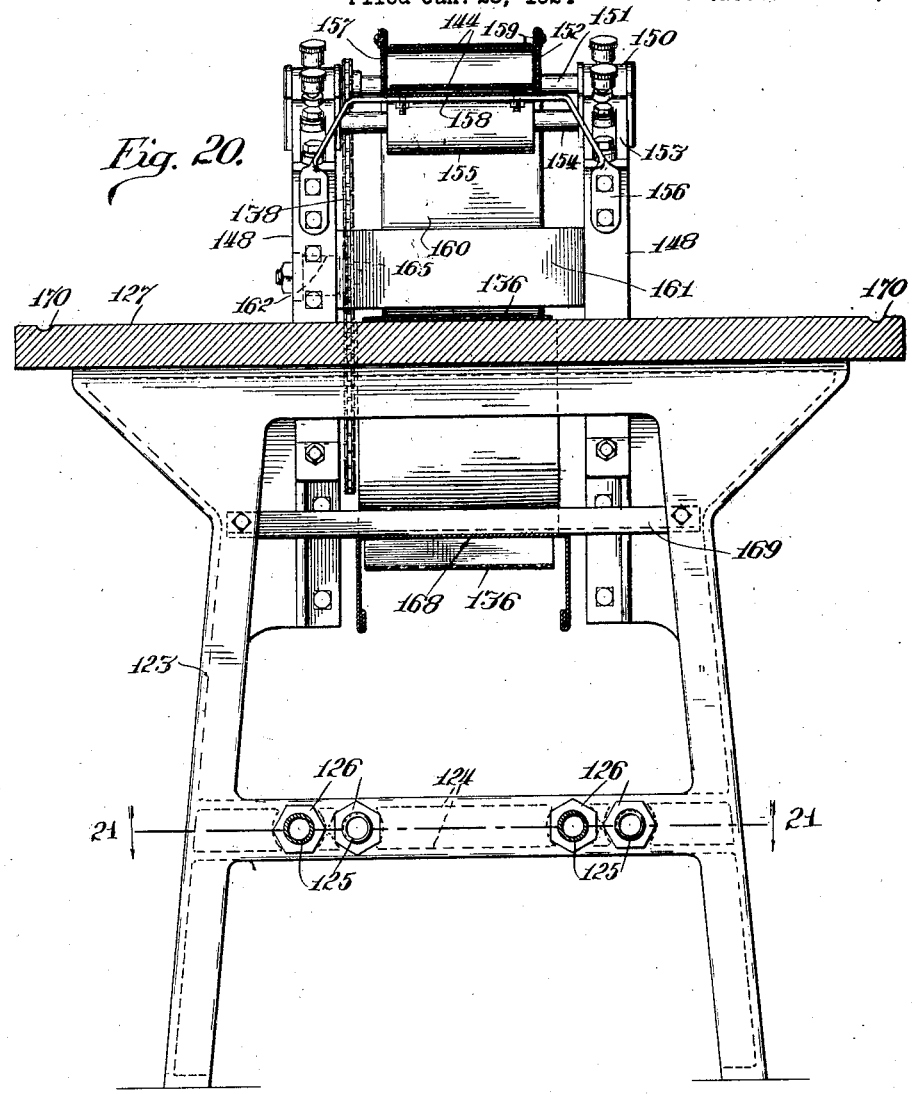
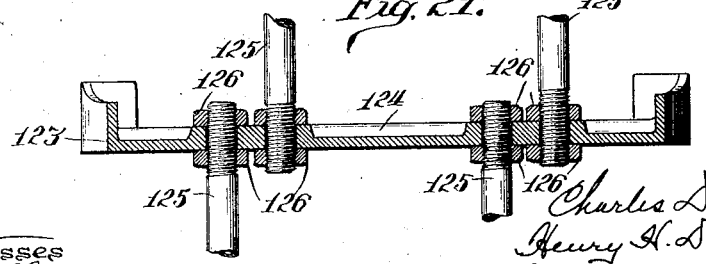

Patented Sept. 11, 1928.

1,683,873

UNITED STATES PATENT OFFICE.

CHARLES DOERING AND HENRY H. DOERING, OF CHICAGO, ILLINOIS.

BUTTER-PRINT MACHINE.

Application filed January 28, 1924. Serial No. 688,937.

Our invention relates to a butter working and print machine whereby the material will be positively fed from the hopper or receiving trough end of the machine toward the print-forming end thereof and the butter formed into prints of the desired compactness and size.

One object of the invention is to provide a machine wherein the temperature of the feeding mechanism may be controlled in keeping with the nature or consistency of the butter or butter substitute in order that the butter or butter substitute may be properly softened when necessary so as to present less friction to the working mechanism and at the same time permit a complete working of the material in order that it will be absolutely free from color streaks; while at the same time providing means whereby the temperature of the forming head may also be controlled, the butter thereby compacted and a much smoother and finer quality of butter provided, while at the same time enabling a more rapid operation.

Another object of our invention is to provide means whereby the butter prints will be provided with a smoother surface while being delivered to a conveying table or traveling element where the prints are suitably wrapped for shipment; our improved machine being in the nature of a self contained unit entirely under control of the operator. The objects and various advantages of our invention will be more fully comprehended from the detailed description of the accompanying drawings, wherein:—

Figure 1 is a side elevation of our improved machine.

Figure 2 is a detail view in elevation of the adjusting means for the operating mechanism of the circulating pump.

Figure 3 is a longitudinal sectional view of the machine.

Figure 4 is a vertical sectional view taken on the line 4—4 of Figure 1 looking in the direction of the arrows.

Figure 5 is a detail sectional view taken on the line 5—5 of Figure 1 looking in the direction of the arrows.

Figure 6 is a longitudinal sectional view of a portion of the machine constituting a continuation of the right hand end of the machine as shown in Figure 3.

Figure 7 is a plan view of the right hand end of the machine as shown in Figure 1.

Figure 8 is a cross sectional view taken on the line 8—8 of Figure 7 looking in the direction of the arrows.

Figure 9 is a detail sectional view taken on the line 9—9 of Figure 8 looking in the direction of the arrows.

Figure 10 is a detail view looking at the right hand side of Figure 9.

Figure 11 is a detail sectional view taken on the line 11—11 of Figure 1 looking in the direction of the arrows.

Figure 12 is a cross sectional view taken on the line 12—12 of Figure 11, looking in the direction of the arrows.

Figure 13 is a detail view of one of the print cutting wire holding and tension elements.

Figure 14 is a cross sectional view taken on the line 14—14 of Figure 13.

Figure 15 is a sectional plan of the delivery housing or forming head of the machine.

Figure 16 is a sectional view taken on the line 16—16 of Figure 15.

Figure 17 is a longitudinal sectional view, with an intermediate portion broken away, of a modified form of the conveyor portion of our machine.

Figure 18 is a detail sectional view taken on the line 18—18 of Figure 17 looking in the direction of the arrows.

Figure 19 is a detail view partially in section of a take-up sprocket employed in the conveyor mechanism shown in Figure 17.

Figure 20 is a vertical sectional view taken on the line 20—20 of Figure 17 looking in the direction of the arrows.

Figure 21 is a detail sectional view taken on the line 21—21 of Figure 20 looking in the direction of the arrows.

Our invention is exemplified in the drawings as a single feed screw type; it being understood, however, that the various features are equally as well adapted to a machine of the double feed screw type without departing from the spirit of the invention as specifically shown and described. The machine as disclosed comprises a suitable standard or supporting frame 20 on which the working and moulding portion of the machine is mounted, consisting of the elongated housing or block 21 which is provided with a channel lengthwise thereof in which a feed screw 22 is mounted, with the spindle of the screw at one end disposed through the end wall of the housing 21, as shown in Figure 3, where the spindle is provided with a non-rotating collar 23 and with a head block 24 whereby the driving shaft 25 is operatively connected with the spindle. The driving shaft 25 is rotated by means of meshing gears 26, 27 and the clutch mechanism shown at 28; the latter being slidable on the shaft 25 so as to place the shaft 25 into operative relation with gear 26 which meshes with the gear 27 on the main drive shaft 29 when the clutch mechanism 28 is moved to clutch providing position. The clutch mechanism is controlled by a lever 30 fulcrumed at 31 on the bracket 32 and the lever 30 controlled by a link 33 which is pivotally connected to foot lever 34 fulcrumed at 35 on the supporting standard or frame of the machine. The connecting link 33 is shown provided with an encircling spring 36, one end whereof takes against a bracket 37 secured to the frame of the machine while the other end presses against the connection of lever 30 with the link; the spring normally tending to move the clutch mechanism out of clutching position.

The machine (which is shown as a self contained unit) may be driven by a suitable electric motor indicated at 38, the armature shaft whereof is provided with a gear as at 39 which meshes with a gear 40 arranged on the main drive shaft 29; the shaft 29 being disposed lengthwise of the machine with the opposite end thereof shown provided with a gear 41 which in turn meshes with a gear 42 on a stub shaft 43 provided with a bevel gear 44 (see Figure 5); the bevel gear 44 meshing with bevel gear 45 on a shaft 46 provided with a pulley 47 which in turn is provided with the endless carrier or belt 48 for delivering the butter prints onto the wrapping table 49. The endless belt or carrier 48 extends about a pulley 50 at the opposite end of the wrapping table where the latter is also provided with a small roller 51 in the slot through which the belt 48 travels and at a point just beyond the endless carrier so as to direct the butter prints beyond the opening or slot.

The housing 21 is provided with a feed trough or hopper 52 for receiving the bulk material to be fed into the channel of the housing in which the feed screw 22 is located; the trough or hopper being provided with a sloping wall as at 53 to induce a better feed of the material into the channel of the housing; while the latter at the forward end thereof is preferably provided with the gradually tapering orifice induced by the tapering or beveling of the partition walls or blocks as at 54 in Figure 3.

The delivery end of the channel of the housing in which the feed screw is located is provided with a delivery head 55 which in turn terminates in a throat portion 56 having an adjustable wall in the form of block 57 controlled preferably by hand-screw 58 which passes through the strap or yoke member 59 pivotally secured to the side wall of the throat portion 56; the yoke or strap 59 being secured by means of a hand-screw 60 which passes through an elongated slot 61 in the wall member or block 57 and clamps the block in the adjusted positions; while the inner end of the handscrew 58 is preferably provided with an anti-friction portion or sphere as at 62; all shown in Figure 12.

The spindle of the feed screw 22 is preferably chambered throughout its length and the threads or spirals are also chambered as shown in Figure 3; the spirals being chambered to a predetermined extent, as shown in Figure 3. The hollow spindle portion of the screw is shown provided with a pipe or tube 63 extending lengthwise thereof; the tube being open at the inner or closed end of the screw while the opposite end of the tube connects with a radially disposed port in the outer end of the spindle which in turn communicates with a chamber or groove on the interior of the non-rotating collar 23 which is provided with a feed line or conduit 64 connected with a pipe 65 which leads to a suitable pump, preferably of the gear type, generally shown at 66 in Figures 1 and 3. The gear pump is operated by means of the pulley 67 and belt 68 which takes about pulley 69 secured on the end of the main drive shaft 29. The pump 66 is arranged in the feed or supply line 70 which leads from a supply tank 71 suitably mounted in the frame or standard of the machine. By means of this construction it is apparent that a tempering fluid or water may be caused to circulate through the feed screw of the machine by being conveyed from tank 71 through supply pipe 70 to pump 66 which forces the water upward through pipe 65 into conduit 64 which delivers it through the port in collar 23, to the annular groove on the collar interior and thence into the pipe 63 disposed within the spindle of the screw. The water is discharged at the inner end of the spindle and causes the hollow spindle with the chambered portion of the spirals to be filled with the tempered water, which is allowed to gradually discharge through a suitable port in the outer end of the spindle and through the stationary collar 23 which is also provided with a discharge port disposed immediately above the cup or flared orifice 72 of a conduit 73 which is connected with the tank 71. The wall of the delivery head 55 is provided with a chamber 74, preferably provided with the inwardly disposed fins or baffles 75 so as to provide a circuitous path and greater radiation, see Figure 15. The chamber 74 of the head 55 receives the tempering water or fluid by means of a conduit 76 which connects with a branch of pipe 65 leading from the force pump 66. The bottom of the housing 55 is provided with an outlet with which conduit 77 connects and which conduit in turn is also connected with the supply tank 71. With this construction it is apparent that a suitable water supply, preferably hot or tempered water, may constantly be kept circulating through the feed screw of the machine as well as through the moulding head especially when the butter or butter substitute is in a more or less hard state, in which condition it is difficult to properly and quickly work and blend the material. We have found that by heating the worm to a proper temperature, as well as the moulding head, the butter or butter substitute is thereby not only softened, so as to offer less friction, while complete and thorough kneading of the material is permitted; but at the same time a working of the material permitted which will result in the butter being absolutely free of color streaks and also of a much smoother consistency and finer quality. Where the butter, or butter substitute, is comparatively soft, heating of the feed screw and delivery or moulding head will not be necessary or at least not to the same degree as when the butter is hard, and for that reason we provide the ramifications or branches of conduit pipe 65 with the valves 78 and 79 whereby the heated or tempered water supply for the feed screw and the moulding head, either jointly or separately, may be shut off. The supply tank 71 is also provided with a suitable draincock and clean out plug as at 80, 80ª see Figures 1 and 3. The connections between the water conveying pipe 65 and the conduit 63 within the screw and between the pipe 65 and the water chambers of the moulding head of the machine are preferably made by means of rubber tubing or hose as shown in the drawings and for that reason we show the inlet and outlet ports of the head each provided with a nipple member 81, see Figure 16, adapted to receive the tubing or hose; the nipple members being shown provided with elongated heads adapted to seat on suitable gaskets or washers as at 82; the nipples being held in place by the small plates 83 removably secured to the inlet and outlet bosses of the head by means of a screw 83ª see Figure 15; the plates being provided with elongated slots (see Figure 15) through which the elongated heads may pass and be held in place when the nipples are given a partial turn.

The throat 56 of the head is provided with printing-forming or cutting mechanism which consists of a suitable frame 84 disposed about the throat and removably secured in place in any suitable manner so as to have the frame extend forward of the orifice of the throat for the purpose of having the cutting wires 85 and 86 extend across the discharge opening. The cutting wires 85 and 86 are arranged at right angles to each other, intersecting substantially at the center of the opening, which causes the issuing butter to be cut into four strips of equal dimensions. The ends of the wires are secured to threaded plugs or bolts 87, the inner ends whereof are preferably split and provided with a cross pin as at 88, see Figures 12 and 13 about which the ends of the wires may be twisted as shown in Figure 13. With this arrangement the wires may be held taut, while at the same time removal or renewal of the wires may be easily made, so that when it is desired to merely cut the issuing butter into two strips or ribbons, one of the cutting wires may be readily removed and half pound prints, instead of quarter pound prints, thereby provided. On the other hand, both wires may be entirely removed by releasing the nuts on the ends of the threaded plugs or bolts, with the result that the butter will issue from the throat in a continuous ribbon or strip for the purpose of providing pound prints.

The butter issuing from the throat of the machine will discharge onto an endless member or apron 89 which is arranged to travel about the rollers 90 arranged in close relation with each other and transversely of the path of the traveling butter. The rollers 90, of which any suitable number are employed, are each provided with trunnions 91 arranged in slots or sockets in the side frames or angle members 92 arranged on the supporting standard or frame of the machine as more clearly shown in Figures 7 and 8. A brine-holding receptacle or pan 93 is arranged intermediate of the angle frame members 92, see Figure 8; the pan being intended to hold a sufficient quantity of brine so that rollers 90 will be partially immersed therein and the endless member or apron 89 is of sufficient length to travel about all of the rollers and also slightly suspend therebeneath in order that it may pass through the brine. The apron is composed of suitable fabric and is employed to prevent the butter from coming into immediate contact with the rollers and be given the imprint of the rollers. By employing such means, the bottom of the butter strips are kept suitably moist and the butter prints will be provided with a smoother surface and will not be given a corrugated surface as otherwise would be the case, especially if the issuing butter is in a more or less soft state; while at the same time the pores of the butter will be more or less sealed and "bleeding" of the butter thereby prevented.

One of the side frames or angle members 92 is provided with extensions or arms 94 to which a cutter frame 95 is pivotally secured preferably by means of the tapered bolts or set-screws 96 which engage with the ends of the rod 97 and permit the cutter frame to swing vertically. The cutter frame consists of parallelly disposed channel members 98 to which the cutting wires 99 are secured; with one end of each wire preferably secured to the end of a threaded member or screw 100 which may be similar to the screws or members 87 previously described, which enable the cutting wires to be held in taut condition and the adjacent sides of the channel members are preferably provided with plates or discs 101, see Figures 8 and 10, removably secured to the channel members and provided with a suitable slot as shown in Figure 10 through which the cutting wires are disposed; the plates or discs prevent flexing and cause proper positioning of the cutting wires. The parallelly disposed members 98, 98 are connected together by the arcuate frame members 102 which are provided with the operating handle 103; while the opposite side of the cutting frame is provided with an extension 104 for a suitable counterbalance weight 105 which enables easy swinging of the cutting mechanism. The extension or arm 94 of the stationary frame is provided with a frame 106 loosely hung on the shaft or rod 97; the outer or free end of the frame 106 being provided with a strip or block 108 adapted to be disposed beneath the arcuate members 102 of the cutting mechanism and in the upward path of the various cutting wires 99. The strip or block 108 is preferably slotted as shown at 109, with the under side or surface provided with a taper or bevel as at 110 in Figure 8 in order that the cutting wires 99 may enter the respective slots 109 of the strip or block 108 when the cutting mechanism or frame is raised, at which time the strip or block 108 will remain in the normal position shown in Figure 8. This causes the cutting wires to enter the beveled slots of the strip or block, with the result that any butter adhering to the cutting mechanism will be stripped or cleaned off the cutting wires. The strip or block 108 is preferably removably secured to the frame members 106, as for example by means of threaded pins provided with butter-fly nuts as at 111; and the normal position of the stripping mechanism is maintained by providing the frame members 106 with the lip or projection 112 disposed beneath the pivotal point thereof and engaged by means secured to frame member extension 94 and later described. The free end of the cutting frame is shown provided with one or more stops shown in the nature of bolts 113 held in adjustable relation with one of the channel members 98, with the head of the bolt adapted to engage the base plate or frame of the machine to prevent the too far downward movement of the cutting mechanism; the normal position of which is such that the cutting wires 99 are disposed slightly beneath the tops of the rollers 90.

The butter-strips or ribbons issuing from the throat of the moulding head of the machine and passing onto the endless element or apron 89 are caused to move beneath the cutting mechanism just described, so that operation of this cutting mechanism by swinging the handle end thereof downwardly into the position shown in Figure 8 will cause the various ribbons of butter to be cut into equal predetermined prints resulting from the equal spacing of the cutting wires 99, so that either pound prints, half pound prints or quarter pound prints will be produced, depending upon whether or not the respective cutting elements or wires 85 and 86 have either been both removed from the throat of the moulding head; or one of the wires removed, or whether both wires have been left in place; the adjustable throat, to wit the side or block member 57 having been adjusted to provide a predetermined sized opening which will cause the butter to be issued in such compact form that the respective prints will be of a predetermined or desired weight.

In Figure 2 we show means whereby any slack in the belt 68 of the gear-pump mechanism may be taken care of by mounting the pulley 67 on a bracket 114 which is provided with an arcuate slot 115 and the bracket member pivoted at 116 to the standard or frame of the machine; the adjusted position of the bracket 114 being maintained by suitable means, as for example by a bolt and butterfly nut as shown at 117. As is apparent from the construction shown, bracket member 114 may be moved through the arc of a vertically disposed circle to take up any slack in belt 68; while the gear mechanism is so arranged that it will remain in constant mesh during the slight arcuate movement necessary on the part of the belt-receiving pulley and its correlated gearing or pinions.

After the hopper or trough 52 has been supplied with the bulk material, the operator depresses foot-lever 34, causing the clutch mechanism 28 to be moved toward clutching position, whereby shaft 25 is thrown into operative relation with the driving shaft 29, causing the screw 22 to be rotated, which in turn will force the butter toward the moulding head 55 and then through the throat 56 thereof; the tapered inner sides of the moulding head causing the butter to be gradually forced into compact condition and through the orifice of the throat onto the endless element or apron 89 which carries the butter beneath the print-forming or cutting mechanism. The formed prints, through the medium of the traveling apron 89, are delivered onto the carrying belt 48 and thence onto the wrapping table 49.

When the butter is more or less hard, the supply tank 71 is provided with water (which may be heated in the tank by means of a suitable burner not shown) and the heated or tempered water caused to pass through the spindle and spirals of the screw as well as through the moulding head upon opening of valves 78 and 79, all as previously described; and in order that a proper temperature of the water may be maintained and observed, we provide the feed pipe 65 with a stand pipe or extension 118 which is provided with a suitable thermometer as at 119.

The stripping mechanism as shown in Figure 8 is shown held in normal position by means of a thumb-bolt 120 threaded through frame extension 94 and held in adjusted position by the butterfly nut 121; while the inner end or head of the bolt 120 is offset or slotted to engage with or receive the depending lip 112 of the frame 106, thereby maintaining the stripping mechanism in position when the cutting frame is raised.

In order to relieve the cutting wires of undue strain when the cutting frame is raised, we prefer to provide the abutting bolt 122, see Figure 8.

In Figures 17 to 21, inclusive, we illustrate a modified form of the conveyor and wrapping table more especially intended to be used in our improved print machine when made of large capacity; the conveyor and wrapping table, as disclosed in Figure 17, permitting a group of wrappers to be stationed at various places lengthwise and on opposite sides of the table. The purpose of the conveyor table, as shown in Figure 17, is to enable a number of operators to wrap the butter-prints issuing from the machine in suitable paraffined paper and when desired also in suitable cartons, without having the fingers or hands of the operators come into contact with the butter prints; the properly wrapped prints being then automatically conveyed to a suitable receptacle at the delivery end of the conveyor table. The conveyor table is preferably intended to be attached and secured to the supporting frame 20 of the print-forming portion of the machine, at the delivery end thereof, where the main supporting frame is provided with a shaft 46 having pulley 47 mounted thereon; the shaft 46 being driven in the manner disclosed in Figure 6 and as heretofore described. The conveyor table, by preference, is formed in sections which may be readily set up and secured together at the point of use and in the exemplification in Figure 17 consists of supporting standards 123 of any suitable number which are preferably of the skeleton formation shown in Figure 20, having the connecting cross-members or ribs 124 which are provided with apertures to receive the threaded ends of the connecting rods 125 secured in place by suitable nuts as at 126 arranged on opposite sides of the cross members or webs 124. With this construction it is apparent that any number of supporting standards may be secured together to support a conveyor table of any length while at the same time providing a rigid construction. The standards 123 support a suitable table-top 127 secured in place in any suitable manner, as for example by the bolts 128 and preferably in a manner which will not interfere with a smooth upper surface on the table-top 127. The receiving end of the conveyor table is shown sloping downwardly toward the print-forming end of the machine; this being preferably accomplished by a separate top section 129, see Figure 17, one end whereof may be supported on the supporting frame 20 of the main portion of the machine while the other end is suitably secured to the table top 127 as for example by means of the angle irons 130 secured to the under side of the table top 127 and the section 129 and bolted together as shown in Figure 17. The standard 123 at what may be termed the outer end of the conveyor table is shown provided with a suitable bracket 131 formed to provide a support for a shaft 132 on which pulley wheel 133 and a sprocket wheel 134 are secured; the bracket 131 being shown provided with an adjusting screw or bolt 135 adapted to control the position of shaft 132 for the purpose of permitting adjustment and taking up any slack that may be encountered in the conveyor belt 136 which is driven from pulley wheel 47. The table-top 127 at a point above the pulley 133 is provided with an opening at 137 to receive the upper portion of pulley 133 and to permit conveyor belt 136 to pass down through said opening, as well as for the passage of sprocket chain 138 which takes about sprocket wheel 134 and is intended to operate mechanism later to be described. The pulleys 47 and 133, as well as the conveyor belt 136 are preferably arranged at the longitudinal center line of the table-top so as to provide operating space on the table-top at opposite sides of the conveyor belt.

The table-top, at suitable points and on opposite sides of the conveyor belt, is provided with a pair of supporting brackets 139 of similar construction and suitably connected together by connecting rods 140; the brackets being secured to the table-top against movement. The upper sides of the brackets are provided with pillow-blocks or supporting members 141 for a shaft 142 provided with a pulley wheel 143 which receives a second conveyor belt 144. The supporting brackets 139 are preferably shown with a sloping upper surface which receives supporting pillow-blocks 145 for a shaft 146 carrying an idler roller 147. The table-top 127, adjacent to the outer end thereof, is also provided with a pair of supporting brackets 148 arranged on opposite sides of the conveyor belt 136 and suitably secured together by means of the connecting rods 149. The brackets 148, like brackets 139, are intended to be firmly secured to the table-top and the upper surfaces by preference are made sloping, as shown in Figure 17 and provided with pillow-blocks 150 providing bearings for a shaft 151 on which a pulley 152 is secured as well as a sprocket wheel adapted to receive sprocket chain 138, while pulley wheel 152 receives conveyor belt 144. The brackets 148 also have pillow-blocks 153 in which shaft 154 is journaled and on which shaft idler pulley 155 is mounted. The idler pulleys 147 and 155 are arranged to bear upward against the lower strand or portion of conveyor belt 144 to elevate the belt so as to provide clearance for the hands of the operators in taking the butter-prints from the main conveyor belt 136. The brackets 139 and 148 on their opposing sides or ends are also shown provided with suitable straps or yokes 156 which support a guard or housing 157 for the conveyor belt 144. The housing at the rear or receiving end preferably extends beyond the first pulley wheel 143 and at a point intermediate of the idlers or guide rollers 147, 155 is provided with a bottom wall 158 so as to prevent the hands of the operators coming into contact with the belt when reaching beneath the upper conveyor which is mounted to provide ample clearance therebeneath.

The housing 157 which, except at the inner end,—is open at its top,—is preferably in the nature of a channel or trough as shown in Figure 20 and at a point intermediate of the pulleys 143 and 152 is provided with a ledge or partition 159 which may be secured in place as shown in Figure 20 by bending the longitudinal edges upward and about the upper edges of the sides of the channel and riveted or otherwise secured thereto. The partition 159 acts as a support for the conveyor belt, especially when a considerable number of butter prints or print containing cartons are placed thereon. By means of sprocket chain 138, driven from pulley shaft 132, the belt 144 is caused to travel in the same direction as belt 136 and the forward end of the guard or housing 157 terminates in a downwardly disposed portion or chute 160 whereby the wrapped prints or cartons are delivered into a suitable receptacle.

With our improved conveyor table, a number of operators may be stationed on opposite sides of the table, each provided with paraffined or suitable wrapping paper whereby the butter-prints carried by the upper strand of belt 136 may be taken off and wapped and the wrapped prints placed on the upper conveyor 144 which delivers it into a receptacle placed at the end of the table.

In the event of any prints escaping the operators and therefore remaining unwrapped, means are provided whereby the prints will be delivered so as to be brought to the attention of the operators. This means consists of a guard 161, which, by preference, is in the nature of a flat strip of metal disposed transversely of the conveyor belt 136, in a diagonal manner with the ends secured to the upright portions of the brackets 148, see Figures 17 and 18. The guard is arranged slightly above the belt 136 so as not to interfere with its operation. With the guard arranged as shown, it is apparent that any prints remaining on the traveling conveyor 136 will be deflected toward one side of the table and therefore moved off of belt 136.

The bracket 148 is also shown provided with a journal 162 secured to the bracket by means of the threaded pin or bolt 163 which passes through a slot 164 in the bracket while the end of journal 162 is shown reduced to receive a sprocket 165 adapted to take up any slack in sprocket chain 138. The journal 162 is provided with a longitudinal bore 166 having intersecting oil passages at the end provided with the sprocket wheel 165 and also a connecting aperture which is provided with a lubricant holding cup 167.

In order to properly safe-guard the operators, we provide the table-standards 123 with a suitable guard 168 arranged lengthwise of the conveyor belt 136 and about the sides as shown in Figure 17; this guard being supported in place by means of cross-bars 169, see Figure 20.

As more or less moisture or salt water is apt to accumulate on the table-top from the butter-prints, we prefer to provide the longitudinal edges of the table-top with the grooves 170, see Figure 20, which will prevent the moisture flowing onto the clothes of the operators.

We have shown what we believe to be a simple adaptation of the invention which has been described in terms employed merely as terms of description and not as terms of limitation, as structural modifications may be made without, however, departing from the spirit of our invention.

What we claim is:—

1. In a butter working and print machine, movable means for receiving the moulded butter, a counterbalanced frame disposed transversely of the path of the butter and pivotally secured at one side so as to swing vertically upward, cutting wires removably secured to said frame, and means pivoted to swing vertically in the same direction as said frame, said means being provided with grooves adapted to receive the cutting wires when the frame is swung upwardly and to strip the butter from said wires.

2. In a butter working and print machine, the delivery end whereof is provided with a counterbalanced frame disposed transversely of the path of the butter and pivotally secured at one side so as to swing vertically upward, cutting wires removably secured to said frame, and stripper means composed of a frame pivotally mounted at the same side of the machine as said counterbalanced frame so as to swing vertically upward, means whereby said frame will normally be held in spaced relation above the plane of the cutting wires and downward movement of said stripper frame prevented, and a grooved member removably secured to said stripper frame, arranged transversely of the cutting wires, adapted to receive the cutting wires when the counterbalanced frame is swung upwardly whereby butter adhering to the cutting wires will be stripped therefrom.

3. In a butter working and print machine, print forming means comprising a frame pivoted at one side to swing vertically, a plurality of cutting wires removably secured to said pivoted frame, a second frame pivotally secured at the same side of the machine as said first mentioned frame, means whereby said second mentioned frame is normally held above the plane of the cutting wires, and a stripper block removably secured to said second mentioned frame, the lower surface of said block at points coincident with the cutting wires being provided with beveled slots adapted to receive the cutting wires when the first mentioned frame is swung upwardly.

4. In a butter working and print machine, print forming means comprising a pair of channel members arranged on opposite sides of the path of the discharged butter, arcuate members connecting said channel members together, openings in the downwardly disposed sides of the channel members, cutting wires arranged in said openings, means threaded in the openings of one channel member and connected with the adjacent ends of the cutting wires whereby the tension of the latter may be controlled, means secured to the channel members whereby flexing of the cutting wires upwardly will be prevented, one of said channel members being provided with laterally disposed lugs, pivot-providing means engaging with said lugs whereby the print-forming means is pivotally secured to the frame of the machine so as to swing vertically, a second frame pivotally mounted at a point concentric with the pivotal mounting of said first means and disposed within the first mentioned frame so as to overhang the path of the cutting wires when said first mentioned frame is swung upwardly, and a continuous member removably secured to the free end of said second mentioned frame, said continuous member, at points coincident with the cutting wires, being provided with sloping grooves on the lower surface thereof adapted to receive the cutting wires when the first mentioned frame is swung upwardly and to strip the butter from the wires.

5. In a machine of the character described, print forming mechanism comprising a pivoted frame arranged transversely of the path of the butter-strips and provided with a plurality of cutting elements, a second frame pivoted to swing vertically and provided with a stripper element arranged normally in spaced relation above the cutting elements, and means whereby upward movement of the second frame may be controlled.

6. In a machine of the character described, print forming mechanism comprising a frame pivoted to swing vertically and provided with a plurality of adjustable cutting wires, a second frame pivoted to swing vertically within the first mentioned frame and provided with a bar having transverse slots in its lower surface adapted to receive the cutting wires when the first frame is swung upwardly, and means whereby the extent of movement of the frames toward each other may be controlled.

7. In a butter print machine, a vertically swinging frame provided with a pair of parallelly spaced channel members, the opposing inner sides whereof are vertically slotted upward from the lower edges, a plurality of cutting wires removably secured to the sides of the channel members and disposed through said vertical slots in the inner sides, tension-applying means secured to one end of each wire and adjustably secured in the outer side of one channel member, a second frame loosely journaled on the axis of the first frame, means for limiting the movement of said second frame, and a slotted block secured to said second frame with its slots in vertical alignment with the cutting wires so as to receive the latter when the first frame is swung upwardly.

CHARLES DOERING.
HENRY H. DOERING.